United States Patent [19]

Kun

[11] 4,430,011
[45] Feb. 7, 1984

[54] INTEGRAL BEARING SYSTEM

[75] Inventor: Leslie C. Kun, Grand Island, N.Y.

[73] Assignee: Union Carbide Corporation, Danbury, Conn.

[21] Appl. No.: 403,932

[22] Filed: Aug. 2, 1982

[51] Int. Cl.³ .............................................. F16C 27/02
[52] U.S. Cl. ...................................... 384/99; 384/218
[58] Field of Search ................. 384/99, 218, 215, 287, 384/398; 308/184 R

[56] References Cited

U.S. PATENT DOCUMENTS

| | | | |
|---|---|---|---|
| 2,556,020 | 6/1951 | Williams | 230/116 |
| 3,122,399 | 2/1964 | Hunter | 308/8 |
| 3,395,949 | 7/1964 | Kun . | |
| 3,456,992 | 4/1967 | Kulina . | |
| 3,639,014 | 2/1972 | Sixsmith . | |
| 3,836,215 | 9/1974 | Dopkin | 308/184 |
| 3,993,164 | 11/1976 | Brown | 184/6 |
| 3,994,541 | 11/1976 | Geary et al. . | |
| 4,025,130 | 5/1977 | Streifert . | |
| 4,025,134 | 5/1977 | Reisacher . | |
| 4,097,094 | 6/1978 | Gardner . | |
| 4,214,796 | 7/1980 | Monzel et al. . | |
| 4,256,441 | 3/1981 | Arora | 417/407 |
| 4,336,968 | 6/1982 | Hibner | 384/99 |

*Primary Examiner*—Lenard A. Footland
*Attorney, Agent, or Firm*—Stanley Ktorides

[57] ABSTRACT

A bearing system for high-speed rotary machinery wherein shaft support, flexible support and viscous damping are provided by separate and distinct mechanisms each of which can be adjusted independently of the other two.

9 Claims, 1 Drawing Figure

INTEGRAL BEARING SYSTEM

TECHNICAL FIELD

This invention relates generally to the field of bearings for high-speed rotary machinery and more particularly to a bearing system wherein shaft support, flexible support and damping are each provided by distinct systems which can be individually adjusted so as to optimally tune rotary shaft-support system critical freqencies away from the desired operating range of the rotary machinery.

BACKGROUND OF THE INVENTION

The shaft or rotor of high-speed rotary machinery is often supported by bearings so that the shaft may rotate at very high speeds such as up to about 150,000 revolutions per minute (RPM), while retaining its alignment. There are a number of phenomena which act on the shaft to throw it out of alignment and the effects of these phenomena are generally more severe at higher rotational speeds.

One such phenomenon is often termed synchronous whirl and is caused essentially by centrifugal forces acting on a mass-unbalanced shaft. The shaft is generally mass-unbalanced because typically the geometric and inertial axes of the shaft are not identical due to such factors as machining tolerances and material imperfections. Further unbalance may result from repeated assembly and disassembly of multiple elements, from normal wear and from shaft deflection during operation. At certain rotational speeds, the shaft tends to rotate on its inertial rather than its geometric axis causing the shaft to orbit or whirl within the bearing housing. When the synchronous whirl excites a natural frequency in the bearing system, the system's vibrational amplitudes can become excessive. The system's natural resonant frequency is generally referred to as its critical speed. Since a long shaft supported, for example, by two axially spaced journal bearings can have many lateral modes of vibration, the system can have many critical speeds. Consequently, there may be further cases of synchronous whirl resonance at the second, third or higher critical speeds depending upon the frequencies of the rigid and bending modes of vibrations of the rotor-bearing system.

Another such phenomenon is commonly referred to as half-frequency, half-speed or self-excited whirl. As the shaft speed approaches a speed approximately equal to twice the critical speed, the shaft experiences a harmonic vibration or whirl which is superimposed on the synchronous shaft whirl. This vibration rapidly increases in amplitude and is often catastrophic to the bearing.

Other phenomena which may cause shaft instability, especially in overhung or straddle-mounted rotary machinery such as turbocharges, cryogenic expanders, compressors, expander-driven compressors and the like, are aerodynamic induced excitations which may originate, for example, from pressure variations around the circumference of impellers and seals.

Still another source of rotating shaft instability may be forces stemming from material hysteresis, rubbing between rotating and stationary parts and other such activity common to rotary machinery.

To ensure that the effects of phenomena such as those described do not lead to bearing and perhaps even machine failure, the bearing system must be able to support the shaft while also effectively counteracting the tendency of the shaft to vibrate or to move radially.

One way for the bearing system to counteract the shaft vibrations is by a dual cushion system comprised of springs and viscous fluid. As the shaft moves radially it exerts a force in the direction of movement on the bearing across their common length which force may or may not be equal across this common length. The bearing system resists and cushions this force by exerting a force on a spring mechanism in contact with it and a stationary surface, and on a viscous fluid between the bearing system and the stationary surface. The different responses to the exerted force by the spring and the viscous fluid tend to dampen the vibration. In such a system, shaft support is provided by the bearing, flexible support is provided by the spring mechanism and damping is provided by the viscous fluid.

One bearing system known to the art is described in U.S. Pat. No. 4,097,094—Gardner. In this Gardner system a journal bearing is resiliently supported in a rigid housing by arcuate spring elements. Viscous damping is provided by a fluid-filled gap between the bearing and the housing. This gap has an axial length less than that of the bearing surface.

The Gardner system has several disadvantages. One disadvantage is that because the amount of viscous damping is directly related to the axial length of the fluid-filled gap, the amount of viscous damping which can be provided is not totally independent of the bearing surface. This is because in the Gardner system the fluid-filled gap cannot have an axial length greater than the bearing surface and thus to achieve a greater amount of viscous damping than that provided by any given fluid-filled gap, one would have to increase the axial length of the bearing surface. This is undesirable because the increased bearing surface introduces a mechanical penalty to the rotary machinery and also because dynamic response problems may arise due to the altered bearing surface and shaft surface relationship.

Another disadvantage of the Gardner system is the limitation on the total amount of damping attainable. As is known, the amount of damping can be increased by decreasing the width of the fluid-filled gap. However, the width of the gap cannot be reduced to less than about 0.001 inch because of machine tolerances. Moreover, thermal distortion of parts, dirt entrained within the viscous fluid and conical excursions of the bearing housing make it difficult to maintain even this size gap. Thus, the Gardner system is constrained in the amount of damping attainable without increasing the gap axial length and unavoidably the bearing surface length.

As previously discussed, at certain rotary speeds the shaft excites a natural frequency in the bearing system which can lead to catastrophic results. One way to avoid such results is to design the bearing system so that its natural frequencies do not coincide with the desired operating rotational speeds of the machinery. However, one is constrained in the design of bearing systems by the need for the bearing system to provide effective shaft support, flexible support and viscous damping.

One way to overcome this constraint is to provide a bearing system wherein these three functions can be adjusted independently of each other. Therefore a change in bearing system design to, for example, avoid the natural frequency problem which may effect one of the bearing system functions would not effect the other two functions. In such a system one could design the bearing system or change the design so as to have a beneficial effect on one function without encountering the possibility of an unavoidable detrimental effect on one of the other functions.

It is therefore an object of this invention to provide an improved bearing system for rotary machinery.

It is another object of this invention to provide an improved bearing system for rotary machinery wherein the shaft support, flexible support and viscous damping functions are provided independently of one another such that each function can be adjusted individually without affecting either of the other two functions.

SUMMARY OF THE INVENTION

The above and other objects which will become apparent to one skilled in this art upon a reading of this disclosure are attained by:

A bearing system comprising:

(A) a stationary support housing having a longitudinal opening therethrough for positioning a rotatable shaft substantially coaxially aligned therein;

(B) an essentially non-rotatable bearing housing positioned between said shaft and said support housing comprising at least one pair of bearing means, each bearing means having a bearing surface for rotatably supporting said shaft, and a spacer portion between said pair of bearing means said spacer portion not supporting said shaft;

(C) viscous damping means comprising a generally uniform annular space between said support housing and said bearing housing along at least a portion of their axial length, said axial length portion being greater than the axial length of said bearing surfaces, said annular space being filled with a viscous material through said axial length portion; and (D) a plurality of spaced elastic supports in contact with said bearing housing and said support housing.

The term "bearing surface" is used in the present specification and claims to mean a surface over which a rotatable shaft and a support are in direct contact or over which a rotatable shaft and a support can exert force on one another through a thin fluid film between them.

DETAILED DESCRIPTION

Figure 1:
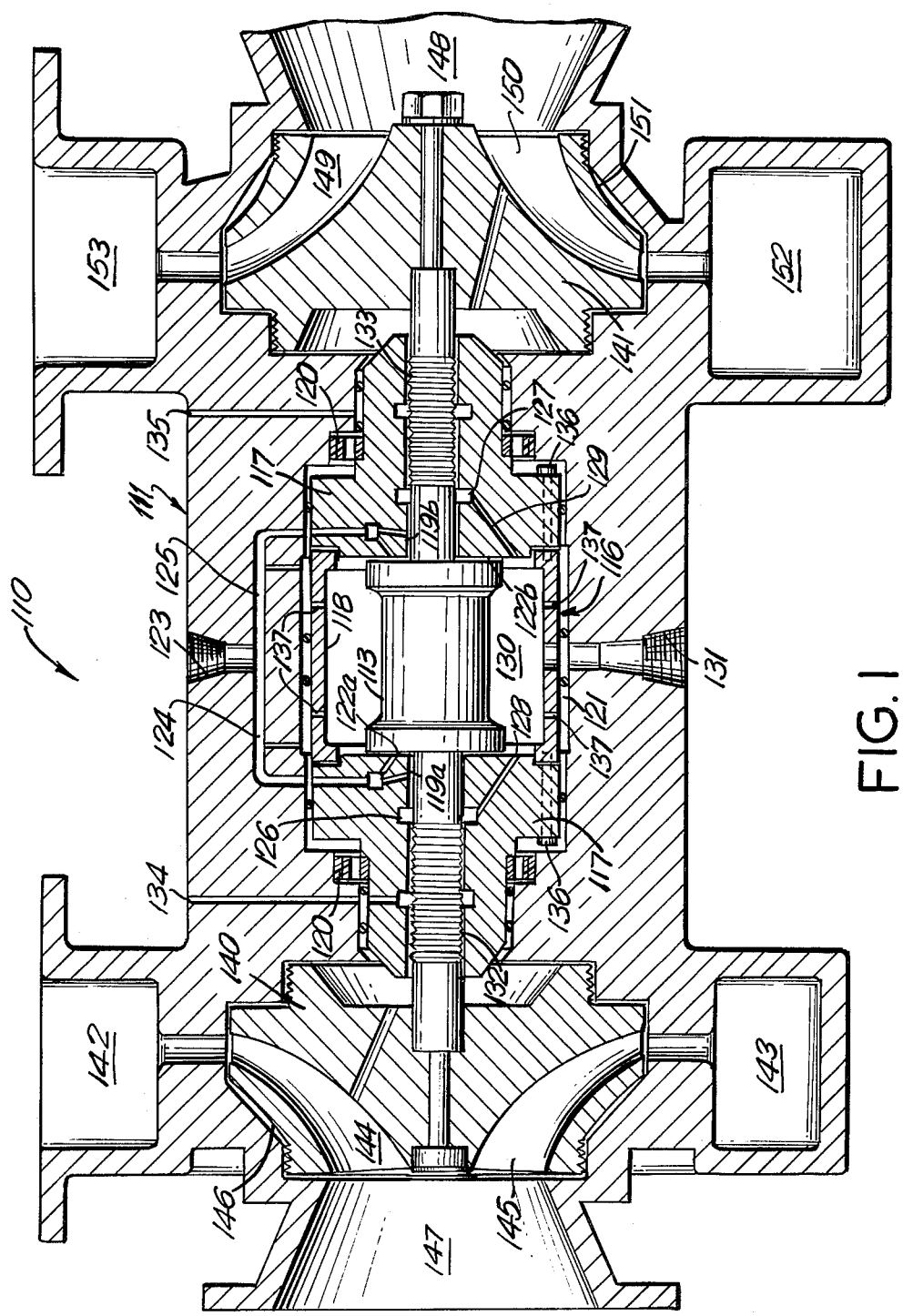
FIG. 1 is a cross-sectional view, with parts in elevation, of an expansion turbine-driven compressor employing one preferred embodiment of the bearing system of this invention.

The bearing system of this invention will be described in detail with reference to FIG. 1.

Assembly 110 has a stationary support housing 111 with a longitudinal opening or bore therethrough. Shaft 113 is positioned within and aligned substantially coaxial with the axis of the bore, and is supported for rotation on essentially non-rotatable bearing housing 116. Rotation of bearing housing 116 may be prevented by, for example, an anti-rotation pin between the bearing housing and the support housing or by means employed to mechanically connect the bearing housing to the support housing.

The bearing housing 116 is positioned between shaft 113 and support housing 111 and comprises at least one pair of axially spaced bearing means or blocks 117 interconnected by annular spacer member 118. Although the axially spaced bearing means 117 and the annular spacer member 118 may be a unitary piece, generally the bearing means and the spacer will be distinct elements which are fastened together.

Bearing means 117 support shaft 113 on a thin film of lubricant delivered at each bearing means through a lubricant supply system which will be described in detail below. In the embodiment of FIG. 1, the bearing means comprise a pair of journal bearings 119a and 119b and also a pair of thrust bearings 122a and 122b.

Bearing housing 116 is generally metallic as appropriate for the use of the rotary machine. For example, when the rotary machine is a cryogenic expander, the bearing housing may be made from a variety of materials including stainless steel, titanium, beryllium and copper. The bearing housing may be made from more than one material. For example, the axially spaced bearing blocks 117 may be made of one material and the annular spacer member 118 may be made from another.

This flexibility in material selection, along with the ability to alter the bearing housing volume relative to the shaft volume, allows one to vary the mass ratio of the bearing housing to the shaft over a wide range. By changing the mass ratio of the bearing housing to the shaft one can change the natural frequencies of the rotary machine and design the machine so that the natural frequencies do not coincide with the desired operating range. Generally the mass ratio of the bearing housing to the shaft will be from about 0.01 to 1.0. The shaft mass includes the mass of turbine wheels, compressor wheels and other necessary elements of the rotatable shaft.

Although bearing housing 116 is non-rotatable, it is free to oscillate in synchronism with the vibration of the rotating shaft. The ability to oscillate is provided by resiliently connecting bearing housing 116 to stationary support 111 by spaced elastic supports or springs 120. These elastic supports are positioned generally symmetrically about the bearing housing to preserve a symmetry of response, and bias the bearing housing toward concentric relation with the support housing.

The elastic support may be of any type, such as undulating springs or coil springs and are sufficiently stiff to resist flexing unless subjected to a substantial load. Preferably the elastic supports are metallic springs. Metallic elastic supports may be integral with either the bearing housing 116 or the support housing 111. However, elastic supports 120 will generally be structurally separate from both the bearing housing 116 and the support housing 111.

Preferably the elastic supports are spaced from the axial ends of the viscous damping means although they may bound the axial ends of the viscous damper. In addition, the elastic supports can be arranged so that the force exerted on them is not aligned with the force exerted on the bearing means, i.e., they need not be positioned in-line with the bearing means.

The elastic supports are chosen in conjunction with the design of the viscous damper to maximize the stability margin of the rotary device. As recognized by one skilled in this art, excessive stiffness in the elastic supports will inhibit the effectiveness of the viscous damper and too soft an elastic support will permit too large a static deflection or displacement of the bearing housing rendering the assembly effectively inoperable.

Vibrations of the bearing housing 116 within the support housing 111 permitted by elastic support 120 are suppressed by viscous damping means 121 comprising a narrow generally uniform annular space or small radial gap between the inner surface of the stationary support housing 111 and the outer surface of the bearing housing 116 along at least a portion of their common axial length.

The radial gap is generally uniform along the axial length. In the FIG. 1 embodiment the radial gap may be from about 0.002 to 0.055 inch, preferably about 0.003 to 0.015 inch.

The damping means or annular space 121 is filled with a material having the viscosity and chemical properties suitable for a specific application. Generally the material used is a fluid and preferably it is the same as the fluid used in the bearings. Viscous materials which may be suitable for use in this invention are many and include natural and synthetic oils including silicones, diesters, polymer oils, phosphate esters, as well as glycols and water.

When a fluid is used as the viscous material in damping means 121, an appropriate supply network is employed. The supply network shown in FIG. 1 will be described in detail below.

The magnitude of damping provided by damping means 121 varies with the axial length of the damping means. Because the axial length of the damping means is not limited by the axial length of the bearings, one can achieve a larger amount of damping than has been heretofore possible for any given size bearing. This capability is especially useful at the higher rotational frequencies. Moreover, the magnitude of the damping provided can be varied over wide limits without changing the stiffness characteristics of the overall assembly, since the damping can be increased by increasing the axial length of the damping means, without affecting the design or performance of either the shaft supports; i.e., bearings or the elastic supports.

Furthermore the bearing system of this invention allows one a great deal more flexibility in supplying damping than has been heretofore possible. As is known to those skilled in the art the damping force is proportional to $$D(L/C)^3$$

where D is the diameter of the fluid gap, L is the length of the fluid gap and C is the radial depth or width of the fluid gap. As was previously described, one can increase the amount of damping by increasing L. Also, one can increase the amount of damping by decreasing C. However, it is not desirable to decrease C to less than about 0.001 inch because of machining tolerances. Moreover, thermal distortion of parts may reduce such a small clearance to zero, and dirt entrained within the viscous fluid and conical excursions of the rotor may prevent or limit the necessary relative motion of the bearing housing. The bearing system of this invention permits one to overcome this limitation by attaining desired increases in damping by increasing L, thus allowing for greater capability to successfully deal with entrained dirt, machining tolerances, conical excursions and thermal distortion referred to above.

A preferred embodiment for the viscous damping means occurs when the damping means 121 is positioned between the spacer member 118 and the support housing 111. Thus the viscous damping means is not oriented in line with the bearing force transmitted through the bearing surface.

Thus, by the use of the present invention, one can provide the necessary magnitude of damping without being limited to the amount of damping allowable by the length of the bearing means employed.

Referring now to FIG. 1, a turbine wheel or impeller 140 and a compressor wheel or impeller 141 are mounted on the opposite side of shaft 113 within stationary support housing 111. High-pressure fluid to be expanded is introduced radially into the turbine wheel 140 through turbine inlet 142 and turbine volute 143 through nozzles which are not shown. This fluid passes through the turbine wheel passages 144, which are formed by blades 145 extending between wheel 140 and the annular shroud 146, and exits the turbine in an axial direction into the turbine exit diffuser 147. As the pressurized fluid expands through the turbine wheel 140, it turns the shaft 113 which in turn drives some type of power-consuming device, in this case compressor wheel 141.

Rotation of the compressor wheel 141 by the fluid expanding through turbine wheel 140 draws fluid in through the compressor suction or inlet 148. This fluid is pressurized in flowing through compressor passages 149 which are formed by blades 150 extending between wheel 141 and the annular shroud 151, and is discharged through compressor volute 152 and outlet diffuser 153.

Shaft 113 is rotatively mounted on journal bearings 119a and 119b and is axially positioned by thrust bearings 122a and 122b in bearing housing 116. The bearing housing 116 is in turn positioned within a bore in the stationary support housing 111. The support housing 111 will generally consist of a number of separate parts which are fastened or joined together with appropriate fasteners or fittings. Each journal and thrust bearing pair 119a and 122a, and 119b and 122b are provided by an annular bearing means or bearing block 117. The bearing surfaces of the bearing blocks are lubricated through a lubricating network having an inlet 123 and lubrication branches 124 and 125. Lubrication fluid, drawn from a reservoir is delivered into inlet 123, passed through branches 124 and 125, and forced into journal bearings 119a and 119b and thrust bearings 122a and 122b through appropriately sized feed orifices. The lubricant flows axially and radially through the various journal and thrust bearings, lubricating the bearings and supporting the shaft against both radial and axial loads.

The embodiment of FIG. 1 illustrates a pair of thrust bearings in addition to the pair of journal bearings which support shaft 113. As is well recognized in the art, one need not employ thrust bearings if thrust forces are not a problem. If significant thrust forces do exist, one may need only one thrust bearing if the thrust forces can be arranged to be exerted in one direction only.

Lubricant discharged from journal bearings 119a and 119b flows into annular recesses 126 and 127, respectively. The lubricant then flows into main lubricant collection chamber 130 through drain conduits 128 and 129 where it mixes with lubricant discharged from thrust bearings 112a and 112b. When the fluid employed in the viscous damping means is the same as that used to lubricate the bearings, a small orifice 137 may be employed to permit the viscous fluid to pass from the viscous damping means 121 into the lubricant collection chamber 130. Lubricant is removed from chamber 130 through the lubricant outlet drain 131.

In order to prevent lubricant from seeping axially along shaft 113 towards the expander/compressor wheels 140 and 141, labyrinth-type seals 132 and 133 are positioned between the bearings and the wheels. These seals are formed by machining closely spaced knife-like ridges into the shaft 113, thereby creating a restricted flow path along the shaft-bearing housing interface. A seal gas is injected into the labyrinth seals at a point intermediate the ends thereof through passages 134 and 135. This gas is injected at a sufficient pressure so that it will leak axially towards each end of the shaft seal. In this way, the gas effectively seals the working chambers of the assembly against leakage and also prevents any mixing of the working fluids and the lubricant.

Because the seals are integral with the bearing housing, when the elastic supports are positioned generally symmetrically about the bearing housing thus keeping the bearing housing generally in a concentric relation with the support housing, concentricity at the seals is enhanced. This is advantageous because, as is known to those skilled in the art, an eccentric seal may consume up to three times as much seal gas as a concentric seal.

The bearing housing 116, comprises the axially spaced bearing blocks 117 interconnected by the annular spacer member or cartridge spacer 118. The bearing blocks 117 are secured to the member 118 by screws 136 spaced circumferentially around the blocks 117. The bearing housing 116 is resiliently connected to the stationary support 111 by two spaced metallic elastic supports or springs 120. The springs permit the bearing housing to oscillate in synchronism with the vibration of the rotating shaft.

Vibrations of the bearing housing 116 caused by various sources of excitations are suppressed by viscous damper 121, which comprises a small radial gap between the inner surface of the support housing 111 and the outer surface of the annular spacer member or cartridge spacer 118. In this FIG. 1 embodiment, the viscous damper 121 is filled with the same fluid used to lubricate the journal and thrust bearings. This fluid is injected into damper 121 from the lubrication branches 124 and 125 of the lubrication network through appropriate feed conduits. The viscous damper however may be filled with any suitable material and it need not be the same as is used to lubricate the bearings.

Where necessary, annular sealing means, e.g., nitrile rubber O-rings, piston rings, etc., are positioned between the support housing 111 and the bearing housing 116 to isolate various fluid passages.

Although the embodiment shown in FIG. 1 employs journal bearings as the bearing means to support the rotating shaft, this invention is not limited to journal bearings or fluid-film bearings. One can employ other types of bearings to support the rotatable shaft such as ball bearings, roller bearings and magnetic bearings. Since this invention provides a means to increase the magnitude of the damping without need to increase the bearing size, this invention may be particularly useful to reduce the bearing loads and increase the bearing life for non-fluid-film bearings, such as ball bearings. This is because non-fluid-film bearings have very small inherent damping to damp externally induced vibrations.

Another advantage of the bearing assembly of this invention is illustrated in FIG. 1. As recognized by one skilled in this art, in rotary fluid-handling devices such as turbines, compressors and the like, very close clearances are required for gas and liquid seals along the shaft in order to minimize seal gas and lubricant consumption and maximize machinery efficiency. Since the bearing housing 116 is not absolutely fixed but is permitted to vibrate with the shaft, the labyrinth seals therebetween can maintain their design clearances and concentric alignment more readily than otherwise. Consequently, the advantage of reduced displacement between the shaft and bearing housing also benefits the shaft seals, thereby allowing tighter seal clearances to be originally specified.

By the use of the bearing assembly of this invention one now has a bearing assembly wherein shaft support, flexible support and viscous damping can be provided essentially independently, and any one of which may be tuned to its optimum level without affecting either of the other two. This is of particular benefit in high-speed rotary machinery where a large amount of viscous damping may be required.

Although the bearing assembly of this invention has been described in detail with reference to one preferred embodiment, it is understood that there are many more embodiments of this invention within the spirit and scope of the claims.

I claim:
1. A bearing system comprising:
(A) a stationary support housing having a longitudinal opening therethrough for positioning a rotatable shaft substantially aligned therein;
(B) an essentially non-rotatable bearing housing positioned between said shaft and said support housing comprising at least one pair of bearing means, each bearing means having a bearing surface for rotatably supporting said shaft, and a spacer portion between said pair of bearing means, said spacer portion not supporting said shaft;
(C) viscous damping means comprising a generally uniform annular space between said support housing and said bearing housing along at least a portion of theiuraxial length, said axial length portion being greater than the axial length of said bearing surfaces, said annular space being filled with a viscous material through said axial length portion; and
(D) a plurality of spaced elastic supports in contact with said bearing housing and said support housing.

2. The bearing system of claim 1 wherein said bearing means are journal bearings.

3. The bearing system of claim 1 wherein said viscous material is a viscous fluid.

4. The bearing system of claim 1 wherein said viscous damping means comprises a generally uniform annular space between said spacer portion and said support housing.

5. The bearing system of claim 1 wherein said elastic supports are metallic springs.

6. The bearing system of claim 1 wherein said elastic supports are positioned generally symmetrically about the bearing housing.

7. The bearing system of claim 1 wherein said elastic supports are spaced from the axial ends of the viscous damping means.

8. The bearing system of claim 1 wherein said elastic supports are positioned such that a force exerted on the elastic supports is not aligned with a force exerted on the bearing means.

9. The bearing system of claim 1 wherein the opposing surfaces of the bearing housing and the shaft form a shaft seal along at least a portion of their axial length.

* * * * *

UNITED STATES PATENT AND TRADEMARK OFFICE
CERTIFICATE OF CORRECTION

PATENT NO. : 4,430,011
DATED : February 7, 1984
INVENTOR(S) : L.C. Kun

It is certified that error appears in the above-identified patent and that said Letters Patent is hereby corrected as shown below:

In column 1, line 57, delete "turbocharges" and substitute therefore --turbochargers--.

In claim 1, line 15, delete "theiuraxial" and substitute therefore --their axial--.

Signed and Sealed this

Twenty-fourth Day of April 1984

[SEAL]

Attest:

GERALD J. MOSSINGHOFF

Attesting Officer

Commissioner of Patents and Trademarks